Patented Oct. 15, 1929

1,731,487

UNITED STATES PATENT OFFICE

WILLIAM C. GEER, OF NEW ROCHELLE, NEW YORK, ASSIGNOR TO THE B. F. GOODRICH COMPANY, OF NEW YORK, N. Y., A CORPORATION OF NEW YORK

COMPOSITION OF MATTER

No Drawing. Application filed July 10, 1925, Serial No. 42,838. Renewed October 25, 1927.

This invention relates to compositions made from and containing rubber, and its chief object is to provide compositions adapted for use as electrical insulation in marine cables, insulated wires and the like. A further object is inexpensively to provide a class of materials which shall be equal or superior to gutta percha in its desirable characteristics as an electrical insulation, such as dielectric strength, low degree of cold flow and low degree of water permeability and absorption.

Gutta percha, which is now commonly used as an insulation in submarine cables, has been found to have an internal structure, as may be shown by the whitening effect produced by stretching it, a characteristic which seems to indicate that gutta percha is an emulsion or suspension of two or more substances. This is further indicated by the fact that similar resistance to cold flow and a similar whitening effect is observed in raw rubber in which large amounts of lime or animal glue have been incorporated. Such materials as lime or glue, however, may not be used as ingredients in compositions employed for electrical insulations due to their hygroscopic nature. The compositions of the present invention are composed mainly of three materials or components which apparently form, when intimately mixed, an emulsion or a suspension not unlike that of gutta percha and which at the same time is stable as to its internal structure. For convenience, the chief components of the insulation compositions forming the subject matter of this application are hereinbelow designated as A, B and C.

*Material A.*—This component of the insulation composition is one of the hard, brittle isomers of rubber described in an application of H. L. Fisher, Serial No. 758,099, patented Nov. 2, 1926, No. 1,605,180, and includes the reaction products of rubber with sulfuric acid, sulfonic acids and sulfonyl chlorides. The product which is preferable in the present composition consists of rubber 100 parts by weight, pine tar, 1 part and sulfuric acid (sp. gr. 1.84) 7 parts. These ingredients are intimately mixed and heated in a compact mass at 268° F. from 3 to 4 hours, the time of heating depending upon how rapidly the batch heat up sufficiently to initiate a pronounced exothermal reaction, the temperature of the material rising to 390–430° F., and the heating being preferably continued for about two hours after the peak temperature is reached. The resulting product is a hard, tough material capable of being broken or crushed and which may be fluxed and calendered on a hot rubber mill. Alternatively, for the sulfuric acid above, any of the following may be employed: p-phenol sulfonic acid, 17 parts, p-toluene sulfonic acid 15 parts, p-toluene sulfonyl chloride 15 parts, or mixtures of these acids with sulfuric acid. Analysis has shown these products to be mainly hydrocarbons having hydrogen and carbon in the same proportion as in rubber and to be less unsaturated than rubber. The product employed may be washed and dried, preferably in a vacuum drier, before use. This material is designated in the specification and claims as the hard exothermal reaction product of rubber.

*Material B.*—This component may be aptly described as a vulcanized fenolac-rubber, and this term is herein used for brevity and convenience of expression, for the reason that it is composed chiefly of two constituents, a tough, non-grindable fenolac and rubber, the mixture of the two being vulcanized with a small percentage of sulfur and then broken down into a plastic mass on a hot mill. The following detailed description of the preparation of this component is given by way of illustration, it being understood that variations and modifications within reasonably wide limits may be made.

The fenolac is the reaction product of an intimate mixture of 7½ parts of p-phenol sulfonic acid and 100 parts of rubber, when heated in a compact mass from 4 to 10 hours at 250 to 290° F., the time of heating varying somewhat but in any event should be continued for about two hours following the peak of the pronounced exothermal reaction which takes place within the heated mass. The resulting fenolac is tough, leathery and non-friable and when washed and dried as in a vacuum drier, to remove excess acid and moisture, is found upon analysis to consist mainly of a hydrocarbon having hydrogen and carbon in the same ratio as in rubber and to be less unsaturated than rubber.

The above fenolac 100 parts by weight, crude rubber 100 parts, a rubber preservative, such as aldol-alpha-naphthylamine, 3 parts sulfur 4 parts, and an organic accelerator, such as aldehyde-ammonia, 1 part, are intimately mixed on a rubber mill and then cured in ¼ inch sheets, preferably in a press maintained at 294° F. for 165 minutes. The cured material is then placed on a hot rubber mill and masticated for two hours in order to thoroughly break down the rubber. The proportions of the fenolac and rubber in the above recipe may be varied somewhat widely. The product which I have termed vulcanized fenolac-rubber, is in this condition ready for admixture in the insulation composition.

*Material C.*—The third chief component of my insulation composition is rubber in an unvulcanized state, either crude or deproteinized rubber, so called, or rubber from which resins, proteins and similar impurities have been removed. This purification of the crude rubber may be accomplished, for example, by milling or otherwise forming an emulsion of rubber with such alkaline reagents as sodium carbonate, sodium hydroxide, sodium oleate, or the like, and heating this rubber emulsion in open steam, or by boiling in water, for from 10 to 36 hours. The modified proteins and resins, together with other impurities as well as the alkali emulsifying agent, may then be removed by thoroughly washing with water, after which the product is dried, preferably in a vacuum drier. It is to be understood, however, that crude rubber or vacuum dried rubber may be employed in place of the deproteinized rubber herein described. This third component of my insulation compound is designated herein simply as rubber or unvulcanized rubber.

The cable composition which I have already referred to as a suspension or admixture of the three normally solid components herein designated as A, B and C, is formed by a thorough admixture thereof in substantially the proportions indicated hereinbelow, with or without the japan wax, or other rubber flux, and with or without the reaction product of carbon disulfide and para-amino-dimethyl aniline, or other organic rubber preservative; rubber 100 parts by weight, hard exothermal reaction product of rubber, 170 parts by weight, vulcanized fenolac-rubber 110 parts by weight, japan wax 10 to 25 parts, reaction product of carbon disulfide and para-amino-dimethyl aniline 5 to 15 parts. This cable composition may be easily and smoothly tubed in the usual insulation tubing machines, and, within the temperatures to which cable insulations are normally subjected, it is equal or superior to gutta percha with respect to cold flow, dielectric strength, water absorption, and water permeability, and further possesses a high degree of stability.

The cable compositions and the procedure of preparing the same as hereinabove described may be varied somewhat widely to produce compositions of different characteristics particularly adapting them for electrical insulations of various sorts, and I therefore do not wholly limit my claims to the specific ingredients or proportions of ingredients entering into the composition or to the exact procedure for preparing the same.

I claim:

1. A composition of matter comprising (a) unvulcanized rubber, (b) a hard exothermal reaction product of rubber, and (c) a masticated vulcanized rubber having admixed therewith before vulcanization a tough, non-friable reaction product of rubber and sulfonic acid, the three components being intimately mixed to form a stable solid suspension.

2. A composition of matter comprising (a) unvulcanized rubber, (b) a hard exothermal reaction product of rubber, and (c) a masticated vulcanized rubber having admixed therewith before vulcanization a tough, non-friable reaction product of rubber and sulfonic acid, the three components being intimately mixed to form a stable solid suspension in substantially the following proportions: 100:170:110, respectively.

3. A composition of matter comprising an intimate physical admixture of (a) deproteinized rubber, (b) hard exothermal reaction product of concentrated sulfuric acid and crude rubber, and (c) a masticated vulcanized rubber having admixed therewith before vulcanization a tough non-friable reaction product of rubber and sulfonic acid, to which is added during mixing minor portions of a rubber flux and an organic preservative of rubber.

4. A composition of matter comprising an intimate physical admixture of (a) deproteinized rubber, (b) a hard exothermal reaction product of concentrated sulfuric acid and crude rubber and (c) a masticated vulcanized rubber having admixed therewith before vulcanization a tough, non-friable reaction product of rubber and sulfonic acid, to which is added during mixing japan wax and the reaction product of carbon disulfide with para-amino dimethyl aniline.

5. A composition of matter comprising (a) rubber from which the resins, proteins and water soluble impurities have been to a large extent removed, (b) an admixture of rubber, the reaction product of 7½ parts of sulfonic acid with 100 parts of rubber, and sulfur, the admixture being vulcanized and then broken down on a rubber mill, and (c) the exothermal reaction product of 7 parts of concentrated sulfuric acid and 100 parts of rubber, the three components (a) (b) and (c) being intimately mixed to form a stable suspension in substantially the following proportions: 100:110:170.

6. A composition of matter comprising (a) rubber from which the resins, proteins and water soluble impurities have been to a large extent removed, (b) an admixture of rubber, the reaction product of 7½ parts of sulfonic acid with 100 parts of rubber, and sulfur, the admixture being vulcanized and then broken down on a rubber mill, and (c) the exothermal reaction product of 7 parts of concentrated sulfuric acid and 100 parts of rubber, the three components (a) (b) and (c) being intimately mixed to form a stable suspension in substantially the following proportions: 100:110:170, to which is added during mixing japan wax 10 to 25 parts and the reaction product of carbon bisulfide with para-amino dimethyl aniline 5 to 15 parts.

7. A composition of matter comprising rubber and a hard exothermal reaction product of rubber.

8. A composition of matter comprising rubber and a hard exothermal reaction product of concentrated sulfuric acid and rubber.

9. A composition of matter comprising rubber and a hard exothermal reaction product of rubber, to which is added minor portions of a rubber flux and an organic preservative of rubber.

10. A composition of matter comprising rubber and a masticated vulcanized rubber having admixed therewith before vulcanization a tough, non-friable reaction product of rubber and a sulfonic acid.

11. A composition of matter comprising an intimate admixture of rubber and a masticated vulcanized rubber having admixed therewith before vulcanization a reaction product of rubber and sulfuric acid, to which is added during mixing minor portions of a rubber flux and an organic preservative of rubber.

In witness whereof I have hereunto set my hand this 15th day of June, 1925.

WILLIAM C. GEER.